(12) United States Patent
Neal et al.

(10) Patent No.: US 8,676,720 B1
(45) Date of Patent: Mar. 18, 2014

(54) COLLABORATIVE METHOD FOR MANAGING ELECTRONIC CATALOGS

(75) Inventors: Michael Renn Neal, Superior, CO (US); Christopher Wade Beall, Lafayette, CO (US); Craig Zeutzius, Boulder, CO (US)

(73) Assignee: Requisite Software, Inc., Chicago, IL (US)

( * ) Notice: Subject to any disclaimer, the term of this patent is extended or adjusted under 35 U.S.C. 154(b) by 2322 days.

(21) Appl. No.: 10/256,876

(22) Filed: Sep. 26, 2002

(51) Int. Cl.
*G06Q 99/00* (2006.01)

(52) U.S. Cl.
USPC .......................................................... 705/343

(58) Field of Classification Search
USPC ............................ 705/1, 301, 343; 707/3, 509
See application file for complete search history.

(56) References Cited

U.S. PATENT DOCUMENTS

| | | | | |
|---|---|---|---|---|
| 5,319,542 A | * | 6/1994 | King et al. | 705/27 |
| 5,950,173 A | * | 9/1999 | Perkowski | 705/26 |
| 6,032,145 A | | 2/2000 | Beall et al. | |
| 6,321,224 B1 | | 11/2001 | Beall et al. | |
| 6,324,534 B1 | | 11/2001 | Neal et al. | |
| 6,457,011 B1 | * | 9/2002 | Brace et al. | 707/10 |
| 6,484,165 B1 | | 11/2002 | Beall et al. | |
| 6,578,030 B1 | | 6/2003 | Wilmsen et al. | |
| 6,584,462 B2 | | 6/2003 | Neal et al. | |
| 6,631,365 B1 | | 10/2003 | Neal et al. | |
| 6,697,799 B1 | | 2/2004 | Neal et al. | |
| 6,748,376 B1 | | 6/2004 | Beall et al. | |
| 6,871,198 B2 | | 3/2005 | Neal et al. | |
| 6,907,424 B1 | | 6/2005 | Neal et al. | |
| 6,970,840 B1 | * | 11/2005 | Yu et al. | 705/27 |
| 7,039,645 B1 | | 5/2006 | Neal et al. | |
| 7,043,492 B1 | | 5/2006 | Neal et al. | |
| 7,174,339 B1 | * | 2/2007 | Wucherer et al. | 707/102 |
| 7,237,187 B2 | | 6/2007 | Neal et al. | |
| 7,555,490 B1 | | 6/2009 | Neal | |
| 7,555,503 B1 | | 6/2009 | Neal et al. | |
| 7,752,238 B2 | | 7/2010 | Wilmsen et al. | |
| 7,882,156 B2 | | 2/2011 | Wykes et al. | |
| 7,996,428 B2 | | 8/2011 | Neal | |
| 8,112,461 B2 | | 2/2012 | Wykes et al. | |
| 2002/0083062 A1 | | 6/2002 | Neal et al. | |
| 2002/0091923 A1 | * | 7/2002 | Chipman et al. | 713/168 |
| 2007/0299866 A1 | | 12/2007 | Neal et al. | |
| 2010/0057806 A1 | | 3/2010 | Neal et al. | |

\* cited by examiner

*Primary Examiner* — Traci Casler

(74) *Attorney, Agent, or Firm* — Michael Best & Friedrich LLP

(57) ABSTRACT

The present invention allows multiple parties to collaborate on managing the content of an electronic catalog. In one embodiment, the invention can include receiving at a hub records from a first source, receiving at the hub updates of the records from a second source, and transferring the updated records to the first source. In another embodiment, the invention can include transferring to a hub records having information related to items in an electronic catalog and receiving updates of the records from the hub.

26 Claims, 9 Drawing Sheets

COLLABORATIVE METHOD FOR MANAGING ELECTRONIC CATALOGS

BACKGROUND OF THE INVENTION

1. Field of the Invention

The present invention relates to a method for collaboration between multiple parties for the purpose of managing the content of electronic catalogs, such as the descriptions and values of the parameters of items in electronic catalogs. More particularly, the invention relates to utilizing a centralized hub for the collaboration.

2. Description of the Related Art

Searchable electronic catalogs are commonly used in support of various electronic commerce and purchasing functions. These catalogs typically have a user interface for selectively retrieving and displaying records as well as a system for electronically purchasing any items that are selected. Some such electronic purchasing systems are built within complex database structures such as an Enterprise Resource Planning system. There may be aspects of the catalog stored in several different tables and even different databases, for example a vendor master, materiel master, item master and more. This type of structure, while it may be convenient when used in an Enterprise Resource Planning system, renders the catalog difficult and cumbersome to manage and maintain. It also tends to encourage and hide obsolete, redundant and conflicting information within the many tables. The information in a buyer catalog can quickly become out of date from the latest information available from the suppliers of the items.

In order to manage and administer the items in the catalog to correct for these deficiencies, specialized tools, developed specifically for the particular hosting system, are typically required. This makes it necessary for the catalog administrator or manager to be familiar with all the particular specialized tools necessary for each database. The specialized formats and tools also make it very difficult to compare a catalog against a reference or secondary catalog. Currently, several different formats are used for catalogs and for enterprise software, so an expert with one catalog may not be able to work with another catalog. The catalog administrator may also not be aware of the latest changes or additions that should be made to the catalog information.

With some hosting systems, it may be possible to convert the catalog into a more common format, operate on the catalog and then convert it back into the format of the hosting system. For example, data in an Oracle database may be convertible to a spreadsheet or text file, modified, then converted back into a replacement dataset for the Oracle database. This requires tools provided by Oracle or others to do the conversion. The common format also limits the kinds of operations and analysis that can be performed. Most of the desired operations must also be performed manually.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

DETAILED DESCRIPTION OF THE INVENTION

The present invention allows multiple parties to collaborate on managing the content of an electronic catalog. In one embodiment, records are received at a hub from a first source. Updates of the records are then received at the hub from a second source. The updated records are then transferred to the first source. Utilizing a hub allows multiple parties to collaborate to manage the content of the records.

Figure 1:
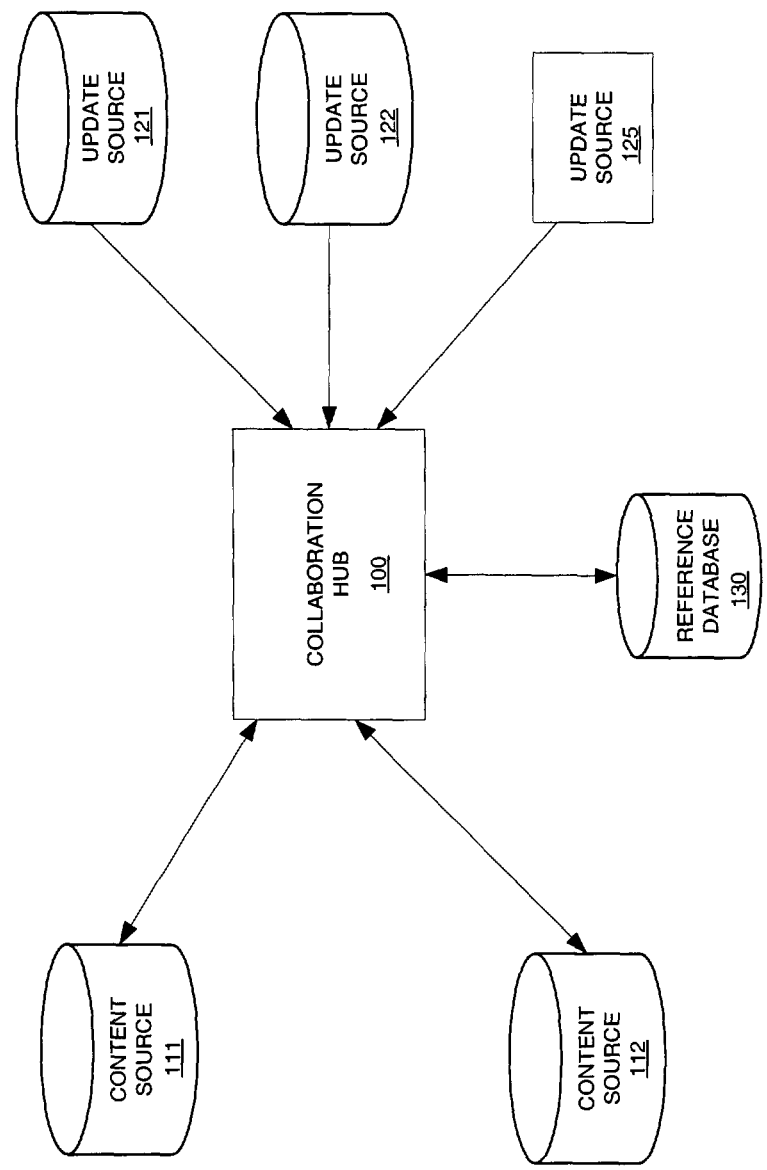
FIG. 1 is a block diagram of a collaboration hub connected to several different sources in accordance with one embodiment of the present invention.

I. FIG. 1 shows a system for collaborative management of multiple catalogs. Multiple parties can collaborate for the purposes of managing an electronic catalog by utilizing a collaborative hub 100. The hub may be implemented as described with reference to the content management system of FIG. 4. Alternately, the hub may be implemented in any manner conducive to allowing collaboration between multiple parties for the purposes of managing the content of a catalog.

One or more content sources 111, 112 are communicatively coupled to the collaboration hub. The content sources contain the information to be managed in the collaboration hub. This information may be records of items in an electronic catalog maintained by a buyer of the items. The format of the content source database is unimportant. Content sources may be databases, spreadsheets, text files, or other formats. Additionally, each content source may have a format and schema different from the other content sources.

One or more update sources 121, 122, 125 are also communicatively coupled to the collaboration hub. These update sources contain updates of the information contained in the content sources. For example, update sources may be records of items in an electronic catalog maintained by the supplier of those items. Each update source may have a unique format and schema. Update sources in electronic format may be databases, spreadsheets, text files, or other formats. Each update source may have a format and schema different from any other update source and that format and schema may be different than the format and schemas utilized by the content sources. Update sources may also be human operators.

A reference database 130 may be communicatively coupled to the collaboration hub. The reference database can be used as an update source. Additionally, the reference database can be a developing repository that is updated as new information becomes available from content or update sources. It should be appreciated that alternate embodiments may not include a reference database.

Figure 2:
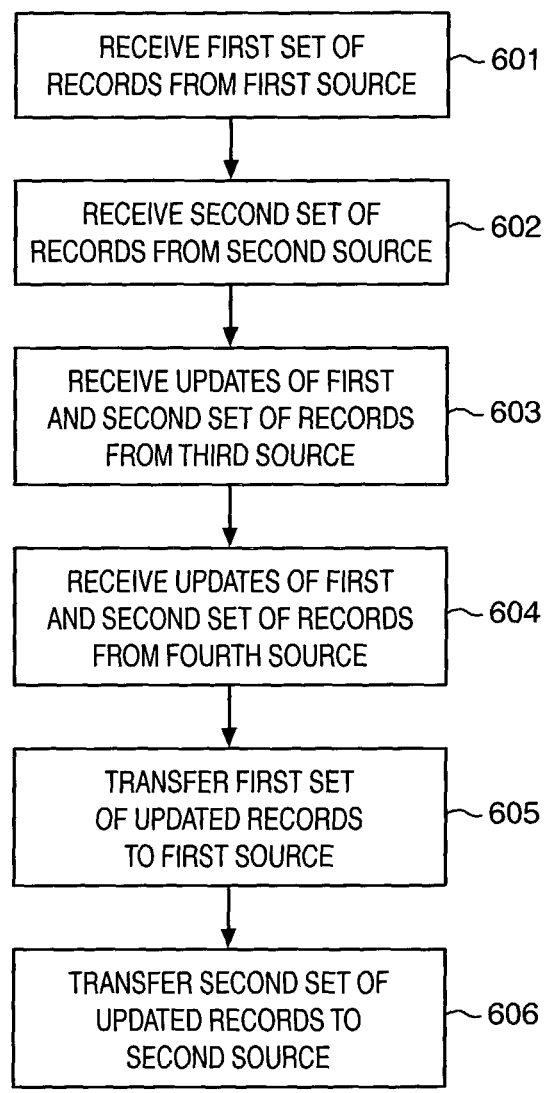
FIG. 2 is a flow diagram of a representative example of collaborative management.

II. FIG. 2 illustrates a method of collaborative management of data according to one embodiment of the invention. Records are received from a first source 601. The received records may contain information about items in an electronic catalog. The records from the first source may be maintained by a buyer of those items. Records may also be received from a second source 602. The second source may be records maintained by a second buyer or may be a second set of records maintained by the first buyer. The first and second set of records may be in the format of a database, XML, text, or other electronic format. After the records are received, parties that may have updates for the records, such as a supplier, may be automatically notified. This notification may be by facsimile, e-mail, or other notification mechanism.

Updates of the first and second set of records are then received from a third source 603 and a fourth source 604. The third and fourth sources may be records maintained by suppliers of items purchased by the first and second source. These records may be in a different format and schema than the records maintained by the first and second sources. The updates may be updates of entire records or may be updates of individual fields of the records. The third and fourth sources may also be human operators. It should be appreciated that in alternate embodiments, updates may only be received from one source or may be received from more than two sources. It should also be appreciated that each update source may only update one set of the received records or fields of the records. For example, the supplier of the item may update a field of an item related to the price of an item for an individual buyer catalog.

Figure 6:
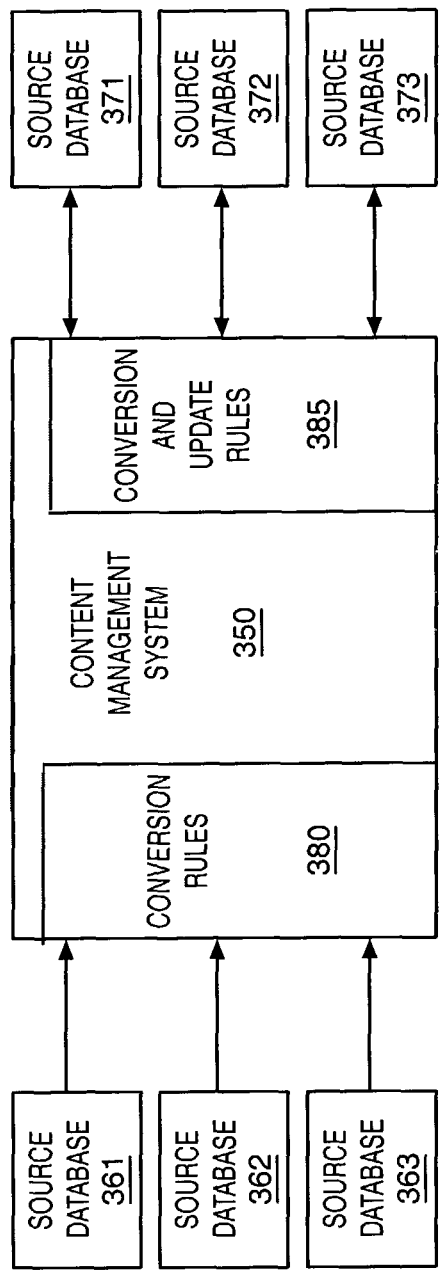
FIG. 6 is a block diagram of a content management system with conversion and update rules in accordance with an embodiment of the present invention.

Users associated with the first or second sources may receive notification that updates are available. This notification may be by email or other electronic notification mechanism. After receiving the notification, the users may choose to accept all, some, or none of the updates. Update rules associated with the first or second sources may be examined to determine allowable updates. This is described in further detail with reference to FIG. 6. After the records have been updated, the first set of updated records are transferred to the first source 605 and the second set of updated records are transferred to the second source 606.

Figure 3:
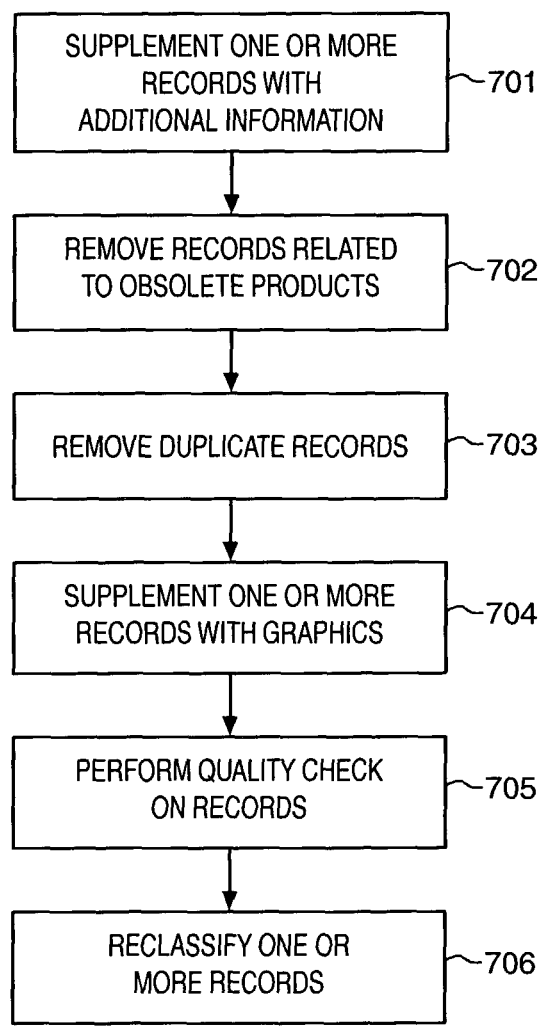
FIG. 3 is a flow diagram illustrating updating an electronic catalog.

Referring to FIG. 3, a method for updating the records will be described in further detail. The content source's records may be supplemented with one or more additional records 701. These records may be records from a new supplier or may be records of new products. Records related to obsolete products may be removed 702. Additionally, duplicate records related to the same product may be removed 703.

One or more records may be supplemented with graphics, illustrations, pictures, 3D files, images, schematics, data sheets, external documents, or other additional information 704. For example, pictures of the product may be added to a record. Audio or video files describing or showing the product may also be added to the record. Additionally, textual information, such as descriptive information about a product, or information missing from the records, such as the price of a product may also be added to the record.

A quality check on the records may also be performed 705. This quality check may be performed by one of the update sources or by the collaboration hub. The quality check is described in more detail in FIG. 5. Finally, one or more records may be classified or reclassified 706. For example, the category of a product may be changed to a different category. Although the foregoing describes certain types of updates that can be made to the records, it should be appreciated that other types of updates not described may also be made.

Figure 4:
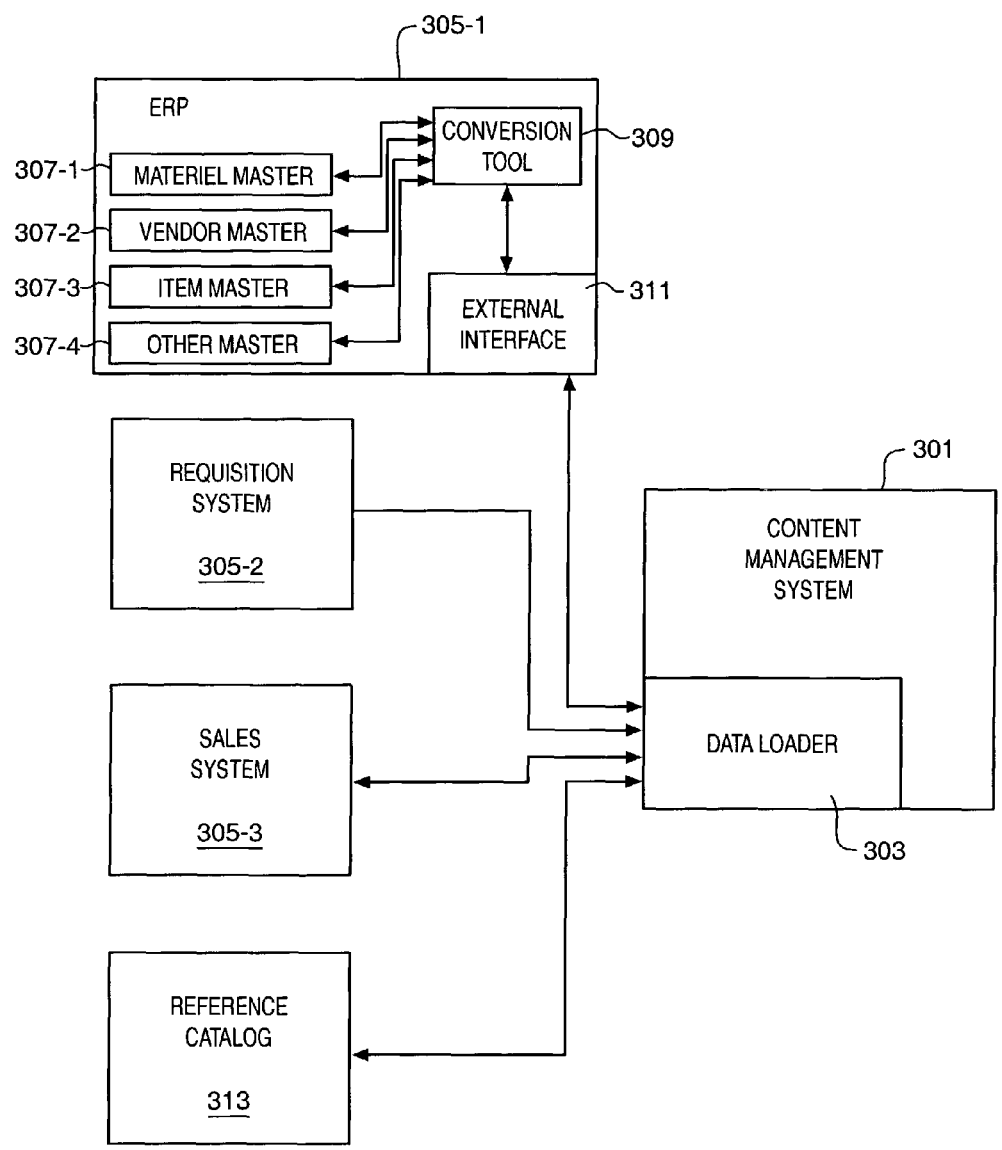
FIG. 4 is a block diagram of a content management system connected to several different databases in accordance with an embodiment of the present invention.

FIG. 4 shows a system for managing multiple catalogs. The catalogs can be managed with a content management system 301. The content management system can have a structure similar to that shown in FIGS. 8 and 9. In FIG. 4, however, the content management system has explicitly been augmented with a data loader 303 to interface with other catalogs and sources of data records. The requisition system of FIG. 8 also interfaces with other catalogs but the data loader and many other details have not been shown in order to simplify the diagram. Through the data loader, the content management system can be coupled to a variety of different systems.

Figure 8:
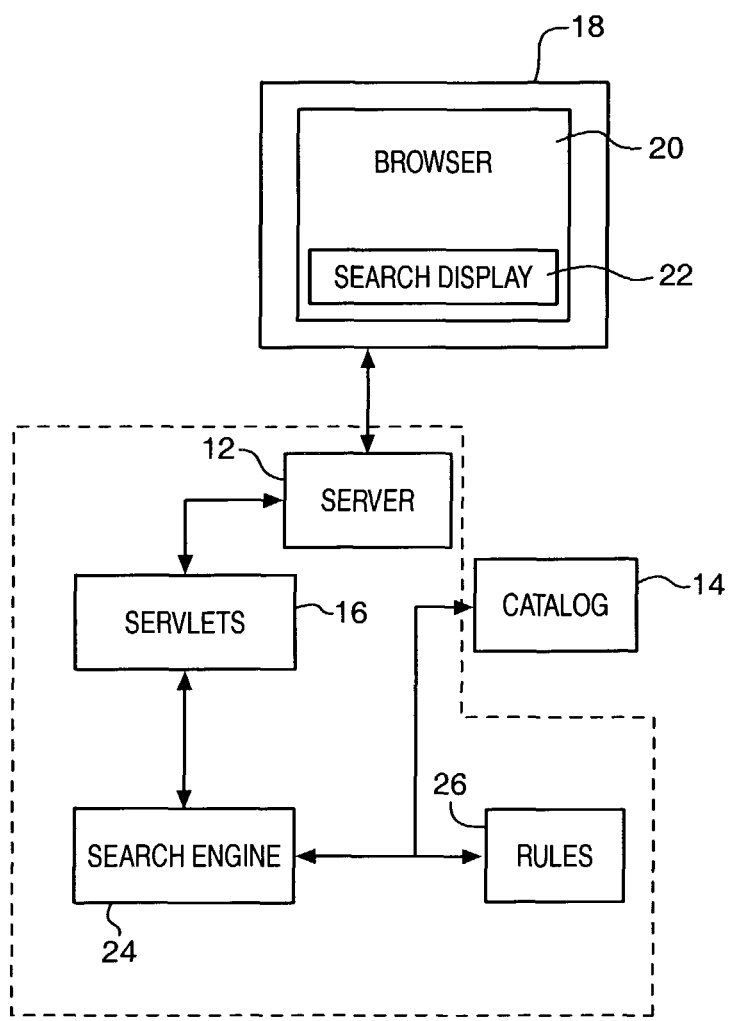
FIG. 8 is a block diagram representation of an electronic catalog system suitable for use in implementing the present invention.

An Enterprise Resource Planning (ERP) system 305-1 is coupled to the content management system through an external interface 311 of the ERP system. The ERP system includes a number of databases 307 which are independently maintained and may have different formats and configurations. The databases can include lists of products and services that are tracked for purchasing, sales, accounting, finance, inventory and a variety of other purposes. In the example of FIG. 4, these databases are a materiel master 307-1, a vendor master 307-2, an item master 307-3 and any number of other masters and other databases 307-4, although other databases are also possible in addition to or instead of the ones shown. The ERP system may have many other systems and components not shown in FIG. 4 to allow it to perform its many other functions as is well-known in the art. The database can constitute one or more of the catalogs 14 as shown in FIG. 8.

The masters are coupled to a conversion tool 309. The conversion tool takes data from the various masters and converts it from the database format of the ERP system and the particular master to a more common and open format, such as some type of delimited text. The text can be delimited by tabs, commas, paragraph marks or any other symbol. Alternatively, the open format may be in the format of a more common database or reference file such as a spreadsheet, a commercial database format or an open standards database format such as XML (Extensible Mark-up Language) text or a SQL (Standard Query Language) statement. The conversion tool can also receive data from the data loader or another source in an open format and convert it back into the format of the source database from which it originally came.

In some ERP systems, the needed data to assemble a complete record may be scattered into several different tables and different databases. The conversion tool or another tool in the system may also serve to compile the data sufficient to create a complete record before the record is converted. In another embodiment, the ERP system has no conversion tool and the conversion is performed by the content management system or an intermediary system (not shown).

Any number of additional databases can be connected to the data loader 303. These other databases may be used for purchasing 305-2, or for sales 305-3, or for any other purpose. They may correspond to marketplace catalogs, Internet sales systems, supplier or manufacturer product inventory databases or any other type of database. They may also correspond to additional ERP systems at the same or different enterprises. For instance, acquisition may cause multiple ERP systems to exist in the same company.

A reference catalog 313 can also be connected to the data loader. The reference catalog can be a complete and accurate listing of all items or it can be a developing repository that is updated as new information becomes available. The reference catalog may have less or more information than the ERP and other catalog systems. For example, it may lack information on any item's availability or price, while a supplier catalog may have information on both. The reference catalog can also have information that is not available in any one other catalog.

For example, the reference catalog may have several different suppliers and supplier part numbers for a single item. While a buyer catalog may include different suppliers for a single item, a supplier catalog probably will not.

Figure 5:
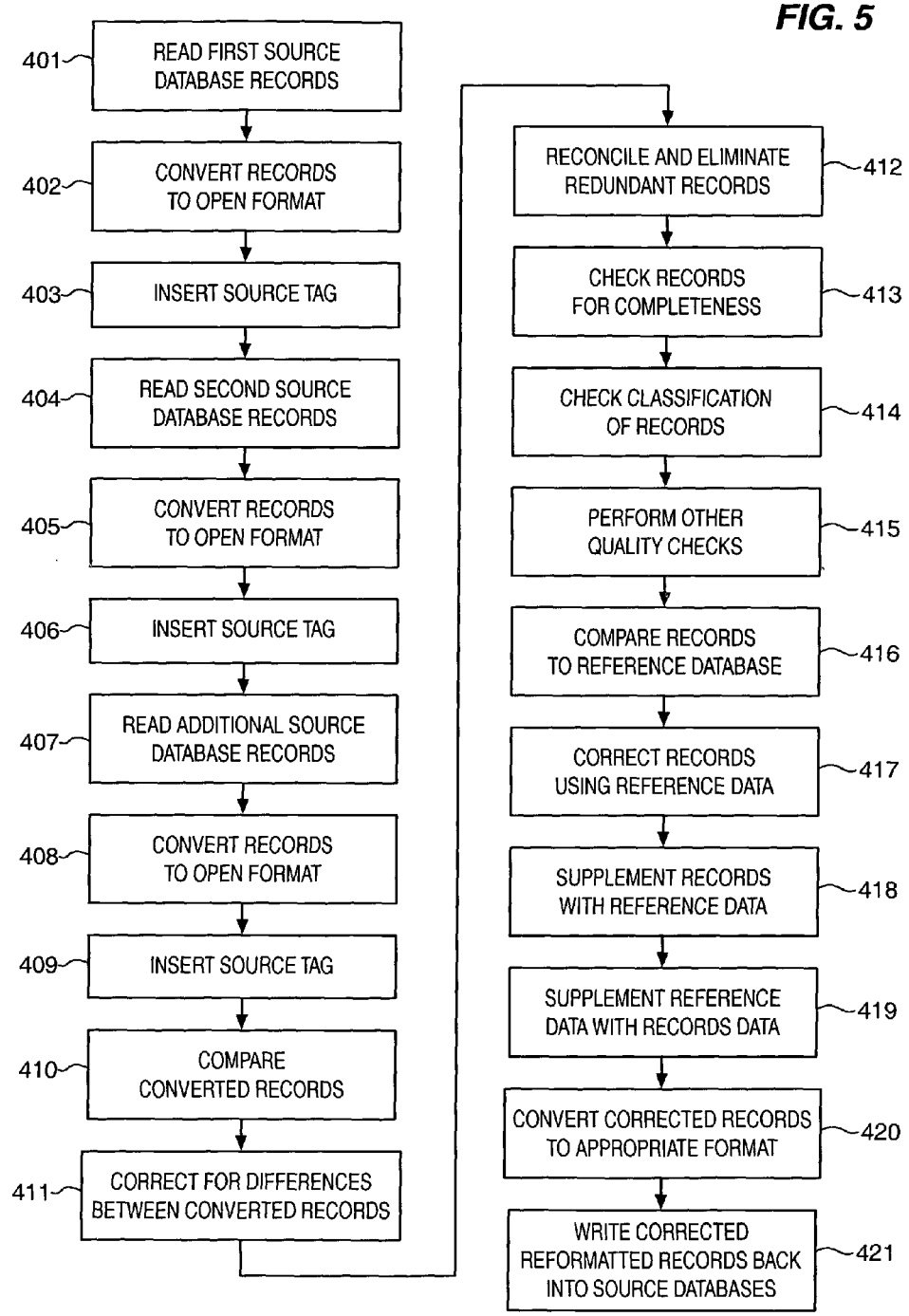
FIG. 5 is a flow diagram of managing content of an electronic catalog using another electronic catalog.

V. Referring to FIG. 5, the operation of the apparatus shown in FIG. 1 can be better understood. In one embodiment, each of the databases or masters 307 of each of the various product or service catalog systems 305 is separately maintained and operated. As mentioned above, this can lead to significant differences in the completeness and accuracy of each database. However, the databases cannot easily be reconciled against each other due first to technical obstacles and second to privacy obstacles.

The technical obstacles can be overcome by using the conversion tool to bring all of the different catalogs into a common format and taxonomy platform or into formats that allow comparisons to be made. The privacy obstacles can be overcome by bringing all of the data into a common third party location, such as the content management system 301 and then returning to each source database only the data that is appropriate to that source database. If the source databases are all maintained by the same enterprise or if there is no private data then the privacy obstacle may not exist. If all the databases are at the same enterprise and the data is freely shared, then the content management system can also be operated and maintained at that enterprise. If all of the information is freely shared, then it may be possible to generate a single complete record for each item and send the same record back to each source database.

In order to begin working with the data in the source databases, the records are read or extracted from the first source database 401. These records are then converted using the conversion tool to the open format 402. In one embodiment, the conversion tool of the ERP system is used to convert the ERP database into delimited text. This text is then converted by the data loader into XML (Extensible Mark-up Language) text according to a particular preferred structure. The XML text for each record will have an inserted source tag 403 to identify the database from which the record came. If there are no privacy concerns and all records are freely shared, then the source tag may not be needed. In another embodiment, the conversion tool provides a spreadsheet or table for the records or an open standards database.

The intermediate format of the converted data is not important provided that it can be recognized and handled by the data loader. The conversion tool is typically bundled with the source database and the offered conversion choices will be controlled by the source database provider. In such an event, the data loader can be configured to finish the conversion into a preferred format that can be used for all the different source databases. In one embodiment, all the data records from all the sources are converted from all the intermediate formats into the same XML format. In another embodiment, the formats differ and an interface enables comparisons. The data loader can also provide the converted records in a spreadsheet or database format instead of XML.

Additional records can be read from a second source database 404 and these records can be converted to the same or a compatible open format 405. Source tags can be inserted as appropriate 406. Additional records can also be read from third, fourth and still more additional source databases 407 and converted into the open format 408. Source tags are inserted as appropriate 409. FIG. 5 shows at least four source databases for the ERP system and two further databases. The number of databases used will depend on system capacity and other configuration issues. In one embodiment, all of the records are converted and merged together into a single collection of records. In another embodiment, the records are operated upon in database pairs until all of the databases have been examined.

Having gathered all of the records from all of the sources together, they can then be compared to each other 410 and evaluated individually as described more fully below. The converted records can be compared to each other to find records missing from any one of the source databases, to find data missing from within a particular record and to identify discrepancies. Missing items in one source database can be copied into the respective source database from one of the other source databases or from a reference catalog. Checks can be inserted so that items are not added if the item is not appropriate for the target database. The source tags can be used to determine which items are added to which database.

There are a number of different checks that can be performed. One basic check is to correct for differences between the converted records for the same item 411. Items can be matched by referring to some value that should be the same in each database. One such value may be the SKU (Stock Keeping Unit), other useful values are the manufacturer's part No. and the supplier's part No. There may also be other values that can be used to determine whether records in different databases refer to the same item. These differences between data records for identical items can be flagged for inspection or changed to agree with any one of the source databases. One of the databases can be selected as a reference database or a controlling database and any inconsistencies can be conformed to that database. For example, one of the databases can be a supplier's or manufacturer's database. This database can be designated as controlling and any missing or differing entries in any record can be filled in with the supplier's data.

The content management system can also reconcile and eliminate redundant records 412. Any one database may have several entries for the same item. These can be identified using, for example a SKU and the records can be merged together. The data from each of the redundant records can be combined to create a record with all of the data that was available. The other redundant records for the item can then be deleted.

The content management system may have many other tools available for managing, analyzing, and improving the quality of the databases. Before or after the processes mentioned above, the records can be checked for completeness 413. A completeness score can indicate how many items are missing from the database or how much descriptive information is missing from items that are in the database or both. This may result in a general score to assess the need for rebuilding the database or the usability of the databases. A source database that is missing a significant amount of data can be replaced by a database from another source, upgraded by filling in data from a reference database or simply flagged as deficient.

In addition, a number of accuracy checks can be made. The checks may be manual, statistical or performed using a reference, master or dominant source. For example, the classification of the records can be checked 414 to ensure that like items are classified together. The organization of descriptive information can also be checked to ensure that values for weight are linked to a weight attribute. Attributes and categories for items can be moved and modified and values for items can be deleted, modified and adjusted.

There are also a number of other quality checks that can be performed 415. These quality checks can result in corrections, alerts or scores. Any one database can be tested for data normalization, completeness, consistency and comprehensibility, for example. Completeness relates to whether the descriptions of the items provide enough information to allow them to be selected, ordered, supplied and paid for. A database can be made more complete by filling in missing parameter information. Consistency relates to how complete records are for different items. A database in which all of the items and all types of items are described in a similar level of detail will be consistent. Comprehensibility relates to the accuracy of the language, units and formats of the values in the data records.

In addition to the comparisons mentioned above, or as an alternative, the gathered data records can be compared to a reference database 416. If there is no reference database, then one can be built by compiling all of the data available for each item using the processes described above. With each new database evaluated, the reference database can grow to include more items. In another embodiment, the reference database has already been compiled and is ready for use in correcting the data records from the source databases. By first extracting the data records and then comparing them to records in the reference database, several benefits are obtained.

First, after the item records are corrected, it is possible to send only the same items back to the source database. If the source database had not been investigated, there would be no way to select which items should be written into the source database. Second, the source database may include data that is not available in the reference database. This data may include such things as negotiated discounts, preferred status, departmental approvals, or internal uses of the item. By supplementing and correcting the source database records this unique information can be preserved. Third, the extracted data can be used to supplement the reference catalog, if appropriate.

Once the records have been compared they can be corrected using the reference data from the reference database 417. In addition, any missing information can be supplemented or filled in using the reference data 418. Conversely, as mentioned above, the reference database can be supplemented with any additional data from the source database records to the extent that it is appropriate 419. At some point, it is also possible to add or delete items from the source database records. If, for example, the source database includes records available from a particular supplier and the supplier has discontinued that item, then the item can be deleted from the database. Alternatively, if the supplier has added new items that would be appropriate for the source catalog, then those items can be added to the source database records. The new items can be selected by reference to the existing items. A source database containing a selection of Bic brand pens costing between $0.75 and $1.20 could be expanded by adding the newest available Bic brand pens in that price range from the same supplier or by adding the corresponding line of Paper Mate brand pens from the same supplier. Such updates provide value to the supplier and the owner of the source catalog.

Once the source database records have been brought to the quality level desired from all of the processes discussed above, the data records can be restored to their original source. By referring to the source tags, the data loader can convert the corrected records back to an appropriate intermediate format, such as delimited text, or a spreadsheet and send the data back to the appropriate origination point. At the origin, the data records can then be converted back to the appropriate database format from which they originated 420. Having been converted, the corrected reformatted records can be written back into the corresponding source databases 421. As mentioned above, it is not important to the invention exactly where the translations and conversions are performed nor which agent performs them. All conversion can be done at the content management system, at the database system or by an intermediate agent.

VI. According to one embodiment of the invention, the content management system may have update and conversion rules. This will be described in further detail with reference to FIG. 6. In this embodiment, the content management system 350 includes Update Rules 380, and Conversion and Update Rules 385.

Each of the source databases 361, 362, 363, 371, 372, 373 may have their own taxonomies including different categories and attributes. Additionally, each source database may be in different formats, such as xml, text, relational database, or other legacy format. One set of source databases 361, 362, 363 may only provide data to the content management system. A different set of source databases 371, 372, 373 may provide data and receive updates from the content management system. For example, suppliers of items in an electronic catalog may only provide their data to the content management system, but buyers of items may provide their data and receive updates of their data from the content management system.

Data from each source database may be converted into the master taxonomy and open format of the content management system using Conversion Rules. Conversion Rules may include rules mapping the different taxonomies of the source databases to the master taxonomy utilized by the content management system. Attributes that do not have a direct mapping into the master taxonomy may be put into separate fields so that no data is lost. However, attribute information that is specific to the source system may not be converted.

Conversion Rules may also include rules converting the formats utilized by the source databases to an open format. Records that cannot be automatically converted may be routed to a failed workflow system. The owner of the database may be notified of the failed conversion via email.

After the records have been converted into the open format and master taxonomy of the content management system, the records may be compared, reconciled, updated, and corrected as described in other parts of this application. Updates may include addition of new records, supplementing existing records with additional information, modifying records, or deleting records. The owner of the source databases may designate Update Rules specifying which types of updates are allowed. Update rules may also specify which type of updates may be automated and which updates require manual acceptance. Updates to records that require manual acceptance may be routed through a workflow system to the database owner. The database owner may then choose to accept or reject the updates.

Figure 7:
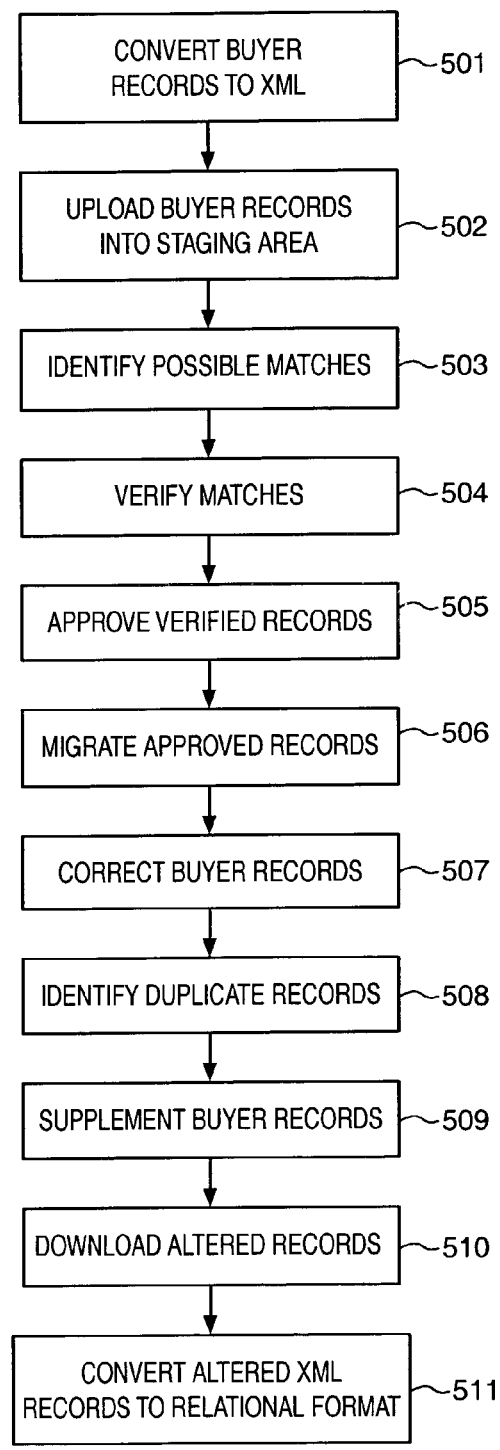
FIG. 7 is a flow diagram of a representative example of managing content of an electronic catalog using another electronic catalog.

VII. Referring to FIG. 7, a specific embodiment of the apparatus will now be explained. In this embodiment, a buyer has a legacy database containing information on products the buyer purchases. The legacy database can be, for example, an Oracle Corporation relational database that is incorporated into an ERP system. A partial list of exemplary records contained in the buyer's database is illustrated in Table A.

TABLE A

| Supplier | Part # | Manufacturer | Description | Price |
|----------|--------|--------------|-------------|-------|
| ABC | 1234 | Bic | blue pen | $0.75 |
| ABC | 1325 | Bic | blue pen | $1.20 |
| ABC | 12444 | Bic | red pen | $0.75 |
| ABC | 1244 | Bic | red pen | $0.75 |

TABLE A-continued

| Supplier | Part # | Manufacturer | Description | Price |
|---|---|---|---|---|

Using a conversion tool, such as Requisite Technology's Materiel Master Link, the records in the legacy database are converted to XML 501. The converted records are then uploaded into a customer staging area of the content management system 502. The staging area is used to help ensure the integrity of the data records in a reference database of the content management system.

Possible matches between the records in the staging area and the records in the reference database of the content management system are then identified 503. Several different algorithms may be used to identify possible matches. These algorithms may include: an exact match on the part number, a fuzzy algorithm match on the part number, and a fuzzy algorithm match on the description. Other matching algorithms may also be used.

The records in the staging area may have one or more possible matches in the reference database. After the possible matches are identified, the supplier verifies the matches 504. Alternately, if a one-to-one match is found, the record in the staging area could be automatically verified.

An attribute of the records in the staging area is then marked approved 505. Approved records can then be migrated into the reference database 506. Thus, the information that was in the buyer's database can be used to supplement the reference database of the content management system.

After the matches are verified, corrections can be made to the buyer's records 507. Duplicate records are also identified 508. Finally, information can be extracted from the reference database to supplement the information in the buyer's records 509.

After the changes have been made to the buyer's records, the records can be downloaded to the buyer 510. The records can then be reconverted from XML to the relational database format used by the buyer 510. The same conversion tool used to convert the records to XML 501 could be used to convert the records back. Alternately, a different conversion tool could be utilized.

Table B illustrates examples of alterations that could be made to the buyer's records by the content management system. The part number of the blue felt tip pen has been corrected. The duplicate red ballpoint pen record with the invalid part number has been removed. The descriptions of all three pens have been supplemented with the additional descriptive information found in the reference database.

TABLE B

| Supplier | Part # | Manufacturer | Description | Price |
|---|---|---|---|---|
| ABC | 1234 | Bic | Round Stic ™ blue ballpoint pen | $0.75 |
| ABC | 1235 | Bic | Softfeel ® FineStyle ™ blue felt tip pen | $1.20 |
| ABC | 1244 | Bic | Round Stic ™ red ballpoint pen | $0.75 |

FIG. 8 is a functional block diagram representation of an electronic catalog and automated purchase requisition system. An application server 12 is connected to interact with a database 14 in the form of an electronic catalog which resides in a computer memory storage device at the server or at another device. The catalog can be integrated with the server, co-located with the server or connected using a local or wide area network connection. Users of the system have workstations or clients 18 that are connected to the application server 12 through a local or wide area network such as the Internet or an intranet. The client includes a browser 20 such as a common Internet web browser or dedicated software through which the workstation communicates with the server 12 to render a search display 22. Commands entered into the web browser software can cause information to be extracted from the database 14 and displayed at the workstation 18 in the search display or in some other display.

While the invention will be described in terms of browsers communicating using typical web interfaces such as HTTP (Hyper Text Transfer Protocol) and Java instructions, the present invention does not rely on any particular platform or interface. The invention can use web-type browser software or software that has been developed specifically for the purposes of the present invention with unique code, interfaces and display technologies. The invention can be implemented on a single machine or with any kind of distributed processing environment from mainframes with dumb terminals to wireless servers with mobile radio PDA's (Personal Digital Assistant).

The database 14 is an electronic catalog of products or services. The database 14 can be constructed using a uniform catalog schema so that each product has a single database record that includes all of its different suppliers. However, multiple catalogs, one or more for each supplier, or an aggregated catalog, an aggregate of product information from multiple suppliers, can also be used. In the aggregated catalog, the same item may be listed several times in inconsistent ways.

In one embodiment of the invention, the server 12 uses servlets 16 to operate a search engine 24 that accesses one or more electronic catalogs 14. The search engine is a common and useful application of the present invention, however the present invention can be used whenever records are retrieved from the catalog. It can be used to generate a catalog to be published whether to a marketplace, a purchaser or a seller. It can also be used for any direct product purchase and for any other use of catalog records, such as system administration, management and quality control.

In the search engine example, the application server 12 queries the database 14 through the search engine and directs the results to the workstation 18. The type or format of the catalog is irrelevant as long as the catalog will respond appropriately to a query from the search engine 24. For example, the catalog may reside within a relational database or may reside within an object-oriented database. The catalog can be stored on a disk drive, a tape drive, RAM, or any other computer data storage devices. The application server 12 may reside in a computer attached directly to the storage device, or alternatively may be connected to the storage device 16 through a network. In one embodiment, the servlets are based on Java APIs (Application Program Interface) and JavaScript/HTML (Hyper Text Markup Language) Interface Generation. These use JDBC (Java Database Connectivity) to communicate through the search engine to a separate data store where the catalog resides. The JDBC protocol allows the search engine to communicate with a catalog based on a variety of different commonly used databases including those available from Oracle Corp., Microsoft Corp., and SAP AG.

The search engine 24 is also connected to a rules store 26 through similar Java or HTTP-type protocols. The rules store contains rules that are used to configure, modify or present data that has been requested by the user. As an alternative to the rules store, the rules can be incorporated into the catalog. In one embodiment, the catalog is in the form of XML (Extensible Markup Language) statements and these statements can include values for attributes of catalog items or rules about how to determine values of catalog items. Other types of markup languages, such as SGML (Standard Generalized Markup Language) and HTML (Hyper Text Markup Language) can be used as can other types of database formats.

Figure 9:
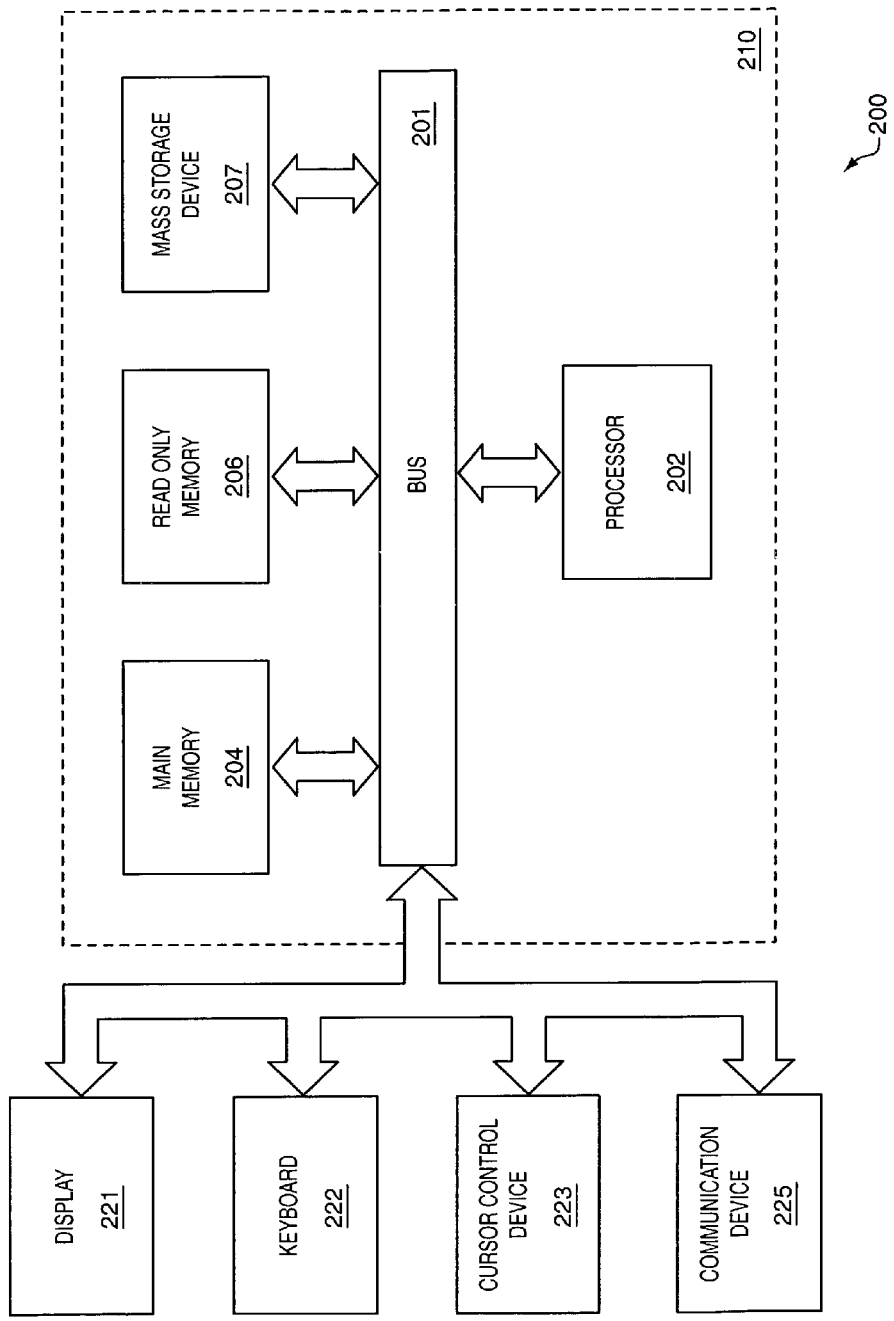
FIG. 9 is a block diagram of a representative example of a computer system suitable for implementing the present invention.

A computer system 200 representing an example of a system upon which features of the present invention may be implemented is shown in FIG. 9. The workstation, search engine, servers, and databases of FIG. 8 will typically be configured similar to what is shown in FIG. 9. Each of these components can be provided using its own computer system or several different components can be combined. For example, the search engine, server, rules, and catalog can all be provided using a single computer system. The computer system can be deployed on a single platform as shown, or different components can be provided on separate platforms so that the bus 201 connects several different platforms together containing different portions or aspects of the mass storage 207 and other system 210 components. The computer system can also be implemented in one or more small portable platforms such as laptops and PDA's.

The computer system 200 includes a bus or other communication means 201 for communicating information, and a processing means such as a microprocessor 202 coupled with the bus 201 for processing information. The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor.

The computer system may also include a nonvolatile memory 206, such as a read only memory (ROM) or other static data storage device coupled to the bus for storing static information and instructions for the processor. A mass memory 207 such as a magnetic disk or optical disc and its corresponding drive may also be coupled to the bus of the computer system for storing information and instructions such as the various databases.

The computer system can also be coupled via the bus to a display device or monitor 221, such as a cathode ray tube (CRT) or Liquid Crystal Display (LCD), for displaying information to a user. For example, graphical and textual indications of installation status, operations status and other information may be presented to the user on the display device. Typically, an alphanumeric input device 222, such as a keyboard with alphanumeric, function and other keys, may be coupled to the bus for communicating information and command selections to the processor. A cursor control input device 223, such as a mouse, a trackball, or cursor direction keys can be coupled to the bus for communicating direction information and command selections to the processor and to control cursor movement on the display 221.

A communication device 225 is also coupled to the bus 201. The communication device 225 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Source Content and the databases can be made available to the computer system in this way.

It is to be appreciated that a lesser or more equipped computer system than the example described above may be preferred for certain implementations. Therefore, the configuration of the exemplary computer system 200 will vary from implementation to implementation depending upon numerous factors, such as price constraints, performance requirements, technological improvements, or other circumstances.

It should be noted that, while the steps described herein may be performed under the control of a programmed processor, such as the processor 202, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to externally supplied attributes of office supplies, the method and apparatus described herein are equally applicable to externally supplied attributes for any other types of electronic catalogs and of any other types of items including documents, and data files. In addition, while the invention has been described in terms of an electronic catalog, other types of ordered information stored in an electronic form can benefit from the present invention.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

The invention claimed is:

1. A method for facilitating collaborative management of a database by a plurality of parties comprising:
   receiving computer records from one of a plurality of content source databases at a collaborative hub, each record having information related to an item in an electronic catalog, each of the plurality of content source databases containing information to be managed via the collaborative hub;
   determining, at the collaborative hub, updates for the received computer records after receiving the computer records based on updates received at the collaborative hub from a source that is different than the content source database and different from the collaborative hub;
   updating, at the collaborative hub, the received computer records based on the determined updates to create updated computer records; and
   sending the updated computer records from the collaborative hub to the content source database.

2. The method of claim 1, further comprising receiving, at the content source database, a notification that updates have been received.

3. The method of claim 1, wherein the updates comprise updates made by one or more suppliers to an update source that is separate from the hub and different from the content source database.

4. The method of claim 1, wherein the updates comprise removal of one or more duplicate records.

5. The method of claim 1, wherein the updates comprise removal of records related to obsolete products.

6. The method of claim 1, wherein the updates comprise adding supplemental information to one or more records.

7. The method of claim 1, wherein the updates comprise adding additional records.

8. The method of claim 1, wherein the updates comprise reclassifying one or more records.

9. A method for facilitating collaborative management of a database by a plurality of parties comprising:
   firstly receiving, at a collaborative hub, computer records from one of a plurality of content source databases, each of the plurality of content source databases containing information to be managed via the collaborative hub;
   secondly receiving, at the collaborative hub, in response to the firstly receiving, updates of the computer records from a source that is different than the content source database;
   thirdly determining, at the collaborative hub, updates for the received computer records based on the received updates;
   fourthly updating, at the collaborative hub, the received computer records based on the determined updates to create updated records; and
   sending the updated records from the collaborative hub to the content source database.

10. The method of claim 9, wherein the records comprise information related to one or more items in an electronic catalog.

11. The method of claim 10, wherein the content source database comprises records maintained by a buyer of the items and the source that is different comprises records maintained by a supplier of the items.

12. The method of claim 9, further comprising automatically notifying a user associated with the source that is different that records have been received.

13. The method of claim 9, further comprising automatically notifying a user of the content source database that updates have been received.

14. The method of claim 9, wherein the updates comprise removing one or more duplicate records.

15. The method of claim 9, wherein the updates comprise removing records related to obsolete products.

16. The method of claim 9, wherein the updates comprise adding supplemental information to one or more records.

17. The method of claim 16, wherein the supplemental information comprises at least one of illustrations, pictures, graphics, 3D files, images, schematics, data sheets, and external documents.

18. The method of claim 9, wherein the updates comprise adding additional records to the one or more records.

19. The method of claim 9, further comprising performing a quality check at the hub on the records.

20. The method of claim 19, wherein the quality check comprises checking records for completeness and completing at least some missing data.

21. The method of claim 19, wherein the quality check comprises reclassifying at least some of the records.

22. The method of claim 21, wherein the reclassifying comprises classifying the records with a master taxonomy by utilizing a mapping from a taxonomy of the content source database to the master taxonomy.

23. The method of claim 9, further comprising supplementing at the hub the records with additional records from a reference database.

24. The method of claim 9, further comprising resolving differences between the received records and a reference database by updating at the hub at least some of the records based on data in the reference database.

25. The method of claim 9, further comprising analyzing the records at the hub for a quality and updating the records based on the analysis.

26. The method of claim 25, wherein the quality comprises at least one of completeness, consistency, and comprehensibility.

* * * * *